March 8, 1927.

P. H. BURKHART ET AL 1,620,187

AUTOMOBILE LIGHTING SYSTEM AND SWITCH MECHANISM THEREFOR

Filed April 22, 1924    2 Sheets-Sheet 1

Inventor
Paul H. Burkhart
Walter L. Bayne
by Percy B. Hills
Attorney

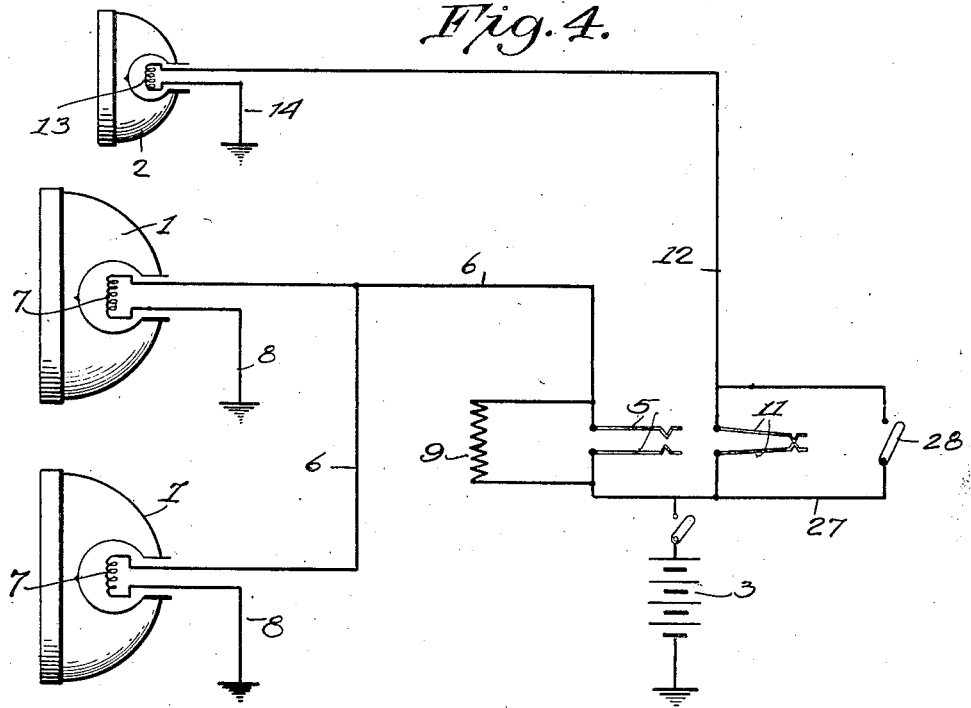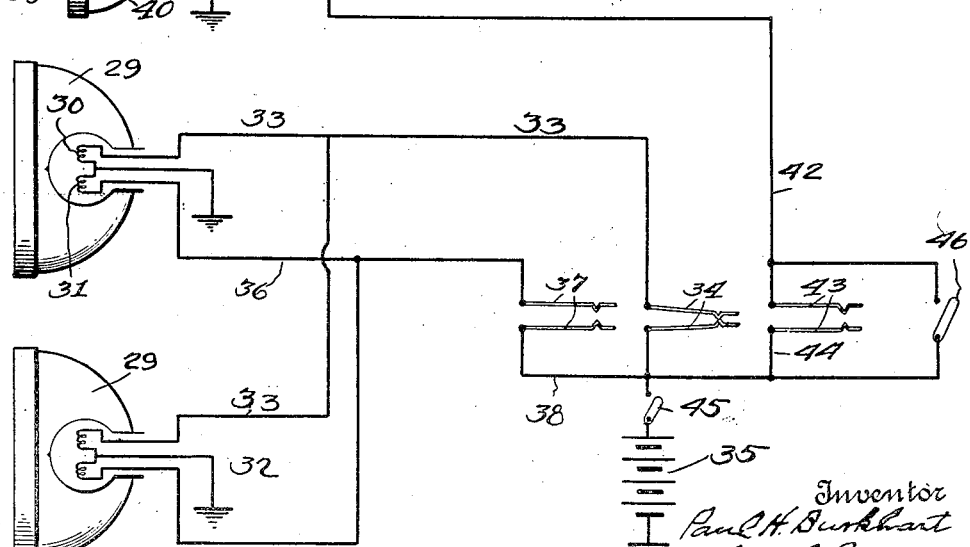

Patented Mar. 8, 1927.

1,620,187

UNITED STATES PATENT OFFICE.

PAUL H. BURKHART, OF NEW HAVEN, CONNECTICUT, AND WALTER L. BAYNE, OF HENRY, ILLINOIS.

AUTOMOBILE LIGHTING SYSTEM AND SWITCH MECHANISM THEREFOR.

Application filed April 22, 1924. Serial No. 708,276.

Our invention relates to switch mechanism for controlling the lights of automobiles, and has for its main object to provide a mechanism adapted to be located in position for ready operation by the driver of the car, and which by a simple movement of the hand of the operator will shift the lights from dim to bright, a subsequent similar movement of the same mechanism reversing the lights, so that similar movements of the operating mechanism alternately will energize the bright and dim lights of the car. We have also associated in the circuits a spot light, which may be energized continuously, or may be disposed in the circuit to be energized only when the dim lights of the car are energized, the switch mechanism automatically controlling the said spot light with the main car lights.

Our invention contemplates novel switch mechanism for accomplishing this result, as hereinafter more definitely will be pointed out and claimed, reference being had to the accompanying drawings, in which:—

Figure 4 is a diagrammatic view of the lamps and circuit shown in Figure 1.

Figure 5 is a diagrammatic view of a system embodying two-filament headlights.

Similar numerals of reference denote corresponding parts in the several views.

Figure 1:
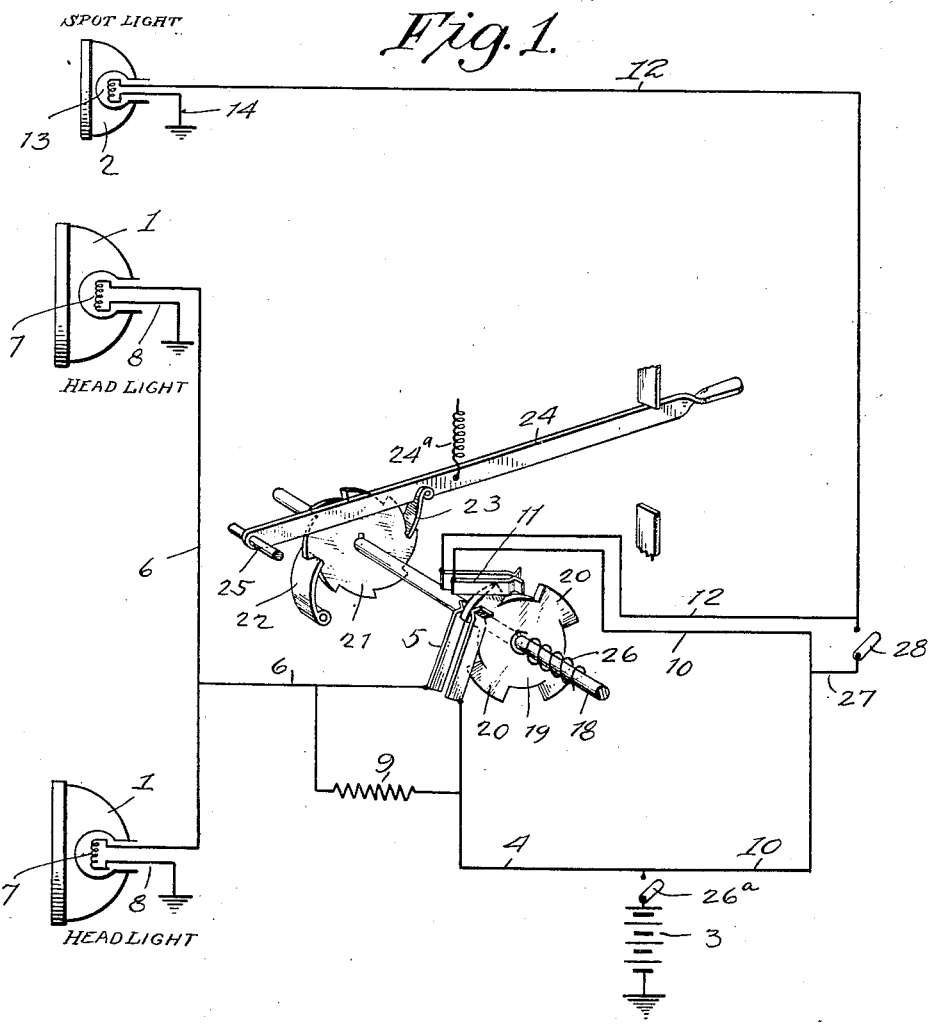
Figure 1 is a view partly diagrammatic and partly perspective, illustrating one form of our improved system and apparatus.

In the said drawings, referring more particularly to Figures 1 and 4, the reference numerals 1 denote the headlights of an automobile, and 2 the spot light. At 3 is shown a source of electrical power, in the shape of a battery, the same being connected to ground at one side and having a wire 4 running therefrom to one arm of a spring switch 5, the other arm of said switch being connected by a wire 6 with the filaments 7 of the headlights 1, the opposite sides of said filaments being connected by wires 8 to ground. Interposed in said circuit upon opposite sides of the arms of the switch 5 is a resistance 9 for a purpose hereinafter to be described. Also running from the battery 3 is a wire 10, which connects with one arm of a spring switch 11 similar to switch 5, the other arm of said switch being connected, by means of a wire 12, with the filament 13 of the spot light 2, the other side of said spot filament being connected by a wire 14 to ground.

Figure 2:
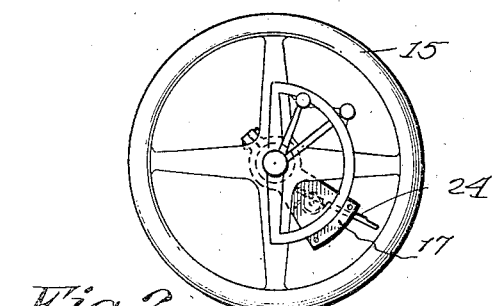
Figure 2 is a top plan view of an automobile steering wheel, showing a casing thereon containing our improved switch mechanism.
Figure 3:
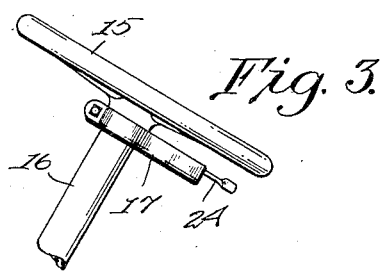
Figure 3 is a side elevation of the steering wheel and the upper portion of the steering post with said casing thereon.

In Figures 2 and 3, we have shown the steering wheel 15 of an automobile, upon the post 16 of which, immediately beneath said wheel, is clamped a casing 17, which contains the switches 5 and 11 and the operating mechanism therefor now to be described. Said mechanism is shown in perspective in Figure 1, where the parts are separated for clearness, and embraces a shaft 18 upon which is mounted a wheel 19 having a plurality of segments 20 formed on its periphery, said segments being formed of insulated material of any suitable character, which material may also be that constituting the entire wheel, if desired. Also mounted on said shaft 18 is a ratchet wheel 21 retained against movement in one direction by a ratchet 22 and adapted to be operated by a pawl 23 pivoted to a lever 24, which in turn is pivoted at 25 within the casing 17. Said casing is apertured to permit the free end of the lever 24 to project therefrom, as shown in Figures 2 and 3, the ends of said aperture forming stops to limit the movement of said lever, said lever being retained normally in the position shown in Figure 1 by a suitable spring 24ª. Also mounted on the shaft 18 is a coiled spring 26 disposed between the wall of the casing 17 and either of the wheels 20 or 21, to afford a frictional resistance against rotary movement.

Disposed in the connection between the battery 3 and the wires 4 and 10 is a master switch 26ª, and in a connection formed by a wire 27 between the wires 10 and 12 leading to the spot light 2 is a cutout switch 28.

From the above description of the system and mechanism the operation of the same will be understood as follows:—With the parts in the position shown in Figure 1, and with the switch 26ª closed, the segmented wheel 20 is positioned so that the arms of the spring switch 5 are separated by one of the insulating segments 20, while the arms of the spring switch 11 are free to contact with each other by their own resiliency. This results in a circuit being established from battery 3 through wire 4, resistance 9, and wire 6 to the filaments 7 of the headlights 1, the resistance 9 causing said headlights to burn dim. At the same time a circuit is established from battery 3 through wire 10, the arms of switch 11, which are in contact with each other, and the wire 12 to the filament 13 of the spot light 2, the return from all of the filaments being through the frame of the machine. Now, when it is desired to obtain the search light effect, a simple movement by the hand of the operator of the lever 24 downward, as shown in Figure 1, or to the left, as shown in Figure 2, will, through the pawl 23, rotate the shaft 18 one step, thereby shifting the segment 20 which lies between the arms of switch 5 so as to release said switch and permit its arms to contact with each other, this movement of the segment causing it to pass between the arms of the switch 11, thereby separating the same, and thus reversing the positions of the arms of said switches 5 and 11. This results in the establishment of a circuit from the battery 3, through the wire 4, the arms of switch 5 and the wire 6 to the filament 7 of the headlights 1, but eliminating the effect of the resistance 9, thereby giving the full lighting effect, or search light effect, to said filament 7. At the same time the separation of the arms of switch 11 will break the circuit to the filament 13 of spot light 2. With the above operation completed, the release of the lever 24 will result in its retraction automatically, through the tension of spring 24ª, to its initial position, with its pawl 23 engaging the next tooth of the wheel 21.

The disposition of this mechanism upon the steering post 16 of the automobile brings the operating mechanism in a position most desirable, and it will be observed that the same movement of the lever 24 alternately converts the lamps 1 from dim to bright, and simultaneously controls the spot light 2, so that it is illuminated only when the lamps 1 are dim.

In Figure 5, we have illustrated our improved system applied to two-filament headlights, and in this system employ three switches in place of the two switches of the system shown in Figures 1 and 4 as follows:—

The headlights 29 are provided with low resistance filaments 30 and high resistance filaments 31, the same having a common connection 32 to ground. Running from the low resistance filament 30 are wires 33, the same being connected with one arm of a spring switch 34, the other arm of said switch being connected with the battery 35. Running from the high resistance 31 are the wires 36 connected to one arm of a spring switch 37, the other arm of which is connected by wire 38 with said battery 35. The filament 39 of the spot light 40 is connected at one side by wire 41 to ground, and at the other side by wire 42 to one arm of a spring switch 43, the other arm of the latter being connected by wire 44 with the battery 35. As in Figures 1 and 4, this system will be provided with the switches 45 and 46 corresponding with the switches 26ª and 28 of Figures 1 and 4.

It will be understood that the spring switches 34, 37 and 43 are mounted to be operated by a segmented disk similar to disk 19, and they will be so positioned that when the arms of the switch 34 are free to contact two segments of the disk 19 will engage and separate the arms of switches 37 and 43, and vice versa. This results in the establishment alternately of a circuit through the low resistance 30 and the high resistance 31 of the lamps 29, the filament 39 of spot light 40 being in circuit only when the high resistances 31 of the headlights 29 are in circuit.

Having thus fully described the invention, what we claim as new and desire to secure by Letters Patent, is:

1. An automobile lighting system, embodying electric lamps of high and low intensity, a separate spot light, circuits therefor, and a single switch adapted alternately to reverse the intensity of said lamps and to open and close said spot light circuit, said spot light circuit being energized with the circuit of low intensity.

2. An automobile lighting system, embodying electric lamps of high and low intensity, a separate spot light, circuits therefor, and a single switch adapted in successive similar movements alternately to reverse the intensity of said lamps and open and close said spot light circuit, said spot light circuit being energized with the circuit of low intensity.

In testimony whereof, we hereunto affix our signatures.

PAUL H. BURKHART.
WALTER L. BAYNE.